United States Patent
Kenig

(10) Patent No.: US 9,193,911 B2
(45) Date of Patent: Nov. 24, 2015

(54) NANOCLAYS CONTAINING FLAME RETARDANT CHEMICALS FOR FIRE RETARDANT APPLICATIONS

(75) Inventor: Samuel Kenig, Haifa (IL)

(73) Assignee: NANTO CLEANTECH S.P.A., Milano (IT)

( * ) Notice: Subject to any disclaimer, the term of this patent is extended or adjusted under 35 U.S.C. 154(b) by 0 days.

(21) Appl. No.: 14/342,800

(22) PCT Filed: Sep. 7, 2011

(86) PCT No.: PCT/IB2011/053905
§ 371 (c)(1),
(2), (4) Date: May 21, 2014

(87) PCT Pub. No.: WO2013/034954
PCT Pub. Date: Mar. 14, 2013

(65) Prior Publication Data
US 2014/0303295 A1  Oct. 9, 2014

(51) Int. Cl.
| | | |
|---|---|---|
| *C08K 5/52* | (2006.01) | |
| *C08K 5/15* | (2006.01) | |
| *C09K 21/10* | (2006.01) | |
| *C01B 33/40* | (2006.01) | |
| *C09C 1/42* | (2006.01) | |
| *C08K 3/34* | (2006.01) | |
| *C08K 9/06* | (2006.01) | |
| *C09K 21/02* | (2006.01) | |
| *C01B 33/44* | (2006.01) | |
| *C09K 21/00* | (2006.01) | |

(52) U.S. Cl.
CPC ............... *C09K 21/10* (2013.01); *C01B 33/40* (2013.01); *C01B 33/44* (2013.01); *C08K 3/346* (2013.01); *C08K 9/06* (2013.01); *C09C 1/42* (2013.01); *C09K 21/00* (2013.01); *C09K 21/02* (2013.01); *C01P 2002/72* (2013.01); *C01P 2002/88* (2013.01); *C01P 2006/37* (2013.01)

(58) Field of Classification Search
CPC .......... C08K 20/10; C08K 9/06; C09K 21/00
USPC ........................................................ 524/127
See application file for complete search history.

(56) References Cited

U.S. PATENT DOCUMENTS

2007/0009724 A1* 1/2007 Bianco et al. ............... 428/292.1

FOREIGN PATENT DOCUMENTS

| JP | 2000169667 A | 6/2000 |
|---|---|---|
| JP | 2002-543260 | 12/2002 |
| JP | 2003103518 A | 4/2003 |
| JP | 2006-504815 | 2/2006 |
| KR | 100840150 | 6/2008 |
| KR | 2010/0105028 | 9/2010 |
| WO | 2121822 | 12/2006 |

OTHER PUBLICATIONS

Bourlinos et al., Chem. Mater. 16, 2404-2410, 2004.*
Giannelis, Adv. Mater., 8 (1), 29-35, 1996.*
Japanese Office Action of Japanese Application No. JP-2014-529077 mailed Apr. 21, 2015.
Athanasios B. Bourlinos et al.,"Clay-Organosiloxane Hybrids: A Route to Cross-Linked Clay Particles and Clay Monoliths", Chem. Mater., 2004, vol. 16, No. 12, pp. 2404-2410.
International Search Report of International Application No. PCT/IB2011/053905 mailed Jul. 10, 2012.
Motokura et al "Layered Materials with Coexisting Acidic and Basic Sites for Catalytic One-Pot Reaction Sequences", Journal of the American Chemical Society, Jun. 17, 2009, vol. 131, No. 23, pp. 7944-7945.

* cited by examiner

*Primary Examiner* — Hui Chin
(74) *Attorney, Agent, or Firm* — Pearl Cohen Zedek Latzer Baratz LLP

(57) ABSTRACT

The present invention concerns fire retardant materials made of polymers, plastics and elastomeric-based materials comprising nanoclays intercalated with protonized silane.

10 Claims, No Drawings

NANOCLAYS CONTAINING FLAME RETARDANT CHEMICALS FOR FIRE RETARDANT APPLICATIONS

CROSS-REFERENCE TO RELATED APPLICATIONS

This application is a National Phase Application of PCT International Application No. PCT/IB2011/053905, International Filing Date Sep. 7, 2011, which is hereby incorporated by reference.

The present invention concerns nanoclays containing flame retardant chemicals for fire retardant applications.

More in particular, the present invention relates to fire retardancy of polymers, plastics and elastomeric-based materials by incorporation of specially treated nanoclays in addition to conventional fire retardant compounds. Still more particularly, the invention provides enhanced fire protection by treating the nanoclays by flame retardant chemicals.

Nanoclays are nanoparticles consisting of inorganic aluminium-silicate having a platelet shape. Depending on chemical composition and nanoparticle morphology, nanoclays are organized into several classes such as montmorillonite, bentonite, kaolinite, hectorite, and halloysite. Organically-modified nanoclays (organoclays) are an attractive class of hybrid organic-inorganic nanomaterials with potential uses in polymer nanocomposites, as rheological modifiers, gas absorbents and drug delivery carriers.

At present, it is known the use of nanoclays together with conventional fire retardant chemicals (such as for example brominated chemicals, phosphates, amino-phosphates, melamine-phosphates) to retard flame propagation in plastics.

However, commercial nanoclays are intercalated (treated) with quaternary ammonium comprising hydrocarbons (tallow-oil) up to 40% by weight content. Consequently, upon exposure to flames, the combustible hydrocarbons decompose to give decomposition products that support the initial flame spread and accelerate the time to ignition of plastics.

In order to overcome the drawbacks of quaternary ammonium hydrocarbon treatment of nanoclays, alternative solutions are also known according to the prior art.

EP2121822 relates to clays and organoclays which are treated with resorcinol diphosphate and/or bisphenol diphosphate as general nanoparticle particle dispersants and replacements for quaternary amines. The two compounds are used as self activating and self dispersing nanoparticles by localizing themselves on the particle surface in a polymer matrix and acting as a nanoparticle dispersants in general, as well as resulting in exfoliation of clays. The exfoliate clays may be used in polymers in lieu of other organic treatments.

KR100840150 discloses a flame retardant polyolefin resin composition including organic onium ion-intercalated nanoclays, in combination with halogen based flame retardants.

However, the major shortcoming for fire retardancy (FR) application is the limited thermal stability of organic—ion used for surface modification of layered silicate materials is. Post-modification of layered silicates, treated with onium ion agents like quaternary ammonium salts or by silane coupling agents, does not solve the problem, since each modifying agent acts separately. Commercial nanoclays modified with quaternary ammonium salts using Thermal Gravimetrical Analysis (TGA) tests demonstrated initial decomposition peaks at 190-220° C.

In the light of the above, the aims of the present invention are the following:

1) enhancing the thermal stability of organically modified nanoclays in order to eliminate or at least to decrease the destructive action of free radicals appearing at thermal processing of polymer based nanocompositions;

2) reducing the concentration of flammable constituents introduced by the organic modifiers and the products of polymers decomposition;

3) employing the ability of nanoclay to interact with organic additives in the process of intercalation (swelling) and thus to use it to serve as a carrier of conventional fire retardant agents; hence, the fire retardancy treated nanoclays distribute the fire retardant agent in the matrix of polymer at nanoscale level;

4) combining chemical modification of nanoclay with swelling of this layered silicate with the conventional fire retardancy.

In this regard it is proposed the solution according to the present invention, providing for a combination of different nanoclays containing flame retardant chemicals for fire retardant applications which carries fire retardant species bounded following two different strategies:

1) protonised silane to exchange sodium ion, and
2) other fire retardant compounds bound to OH group on the edge plane and on the Al/Si oxide nanoclays surfaces, together in the same formulation.

It is therefore an aim of the present invention that of realising nanoclays containing flame retardant chemicals for fire retardant applications allowing for overcoming the limits of the solutions according to the prior art and for obtaining the previously said technical results.

A further aim of the invention is that these nanoclays containing flame retardant chemicals can be realised with substantially reduced costs, as far as both production costs and maintenance costs is concerned.

Not last aim of the invention is that of realising nanoclays containing flame retardant chemicals for fire retardant applications which are substantially simple, safe and reliable.

It is therefore a first specific object of the present invention a fire retardant material comprising nanoclays intercalated with protonised silane.

In particular, according to the present invention, said fire retardant material is made of polymers, plastics and elastomeric-based materials.

Preferably, according to the invention, said fire retardant material further comprises nanoclays intercalated with fire retardant compounds bound to OH group on the edge plane and on the Al/Si oxide nanoclays surfaces.

More preferably, said fire retardant compounds are chosen amongst silanes, phosphates, brominated chemicals, amino-phosphates, melamine-phosphates, having high thermal stability and flame retardation properties.

Optionally, according to the invention, said fire retardant material further comprises conventional fire retardant chemicals, preferably chosen amongst phosphates, brominated chemicals, amino-phosphates, melamine-phosphates, aluminum hydroxides, magnesium hydroxides, or combinations thereof.

Further, always according to the invention, said fire retardant material is based on polypropylene (PP), acrylonitrile-butadiene-styrene (ABS), polybutylene terephthalate (PBT), polystyrene (PS), polyamides (PA).

It is therefore a second specific object of the present invention a method of realising fire retardant material comprising nanoclays intercalated with protonised silane as previously defined, comprising the following steps:

protonising silane by reaction with an acid solution;
adding protonised silane to a dispersion consisting of nano-clays in methanol/water mixture;
heating up to 70° C., thus obtaining a viscous slurry;
filtering the slurry, thus separating a solid fraction;
drying the solid;
grinding the solid to powder;
heating the solid up to 110° C.;
washing the solid with ethanol/water mixture;
drying;
milling to fine powder;
adding the powder to the molten polymers using conventional blending and mixing compounders.

The invention will be summarised in the following for illustrative non limitative purposes and will be disclosed by means of some illustrative examples.

According to the invention, the nanoclays are used as a carrier for the fire retardant chemicals. Since the nanoclays are well dispersed, the fire retardant chemicals which are attached to them are highly effective due to the nano size and the high surface area. The nanoclays also serve as barrier to oxygen (penetration from outside to inside the burning product) and to the resulting organic gases coming out of the burning product that support the fire.

In order to fully cover the nanoclays with the fire retardant chemicals the OH groups on the edges of the nanoclay and the aluminum oxides and silicon oxides that constitute the upper and lower surface of the nanoclays platelet are exploited. Knowing the structure of the nanoclays, it is further possible to calculate the number of potential reactive sites and accordingly add a correct amount of fire retardant chemicals.

Further, according to the invention, protonised silane is used for ion exchange of the $Na^+$ ion. In this way the nanoclays surface is covered with the appropriate amount of fire retardant chemicals. This particular solution overcomes a specific problem of the solutions according to the prior art, not using protonised silane but rather unmodified silane. When silane is exposed to high temperatures, it is converted to SiC like material, which is a ceramic like material with good thermal and mechanical properties. For this reason, silane can be considered as a fire resistant material.

The combinations of fire retardant chemicals to treat the nanoclays according to the present invention allows for obtaining synergy between various fire retardant chemicals in the nano range, which cannot be obtained when only a single fire retardant is used. In the case of the combination, it is also possible to obtain a double layer of fire retardant chemicals attached to the nanoclays.

Moreover, the formulations according to the present invention also provide for the addition of conventional fire retardant chemicals to obtain UL 94 V-0 rating. The presence in the same formulation of treated nanoclays and conventional fire retardant agents allows for reducing the amount of the conventional fire retardant (with respect to the case in which fire retardant agents are used alone) and thus save costs, since fire retardant chemicals are relatively high cost chemicals. In the case of bromine based fire retardant chemicals it is possible to reduce the amount of Br (and antimony tri-oxide—$Sb_2O_3$ which is used as a synergist for the brominated FR—heavy metal) and thus reduce the environmental concerns. It was possible to test that, on the average, by addition of 1% of treated nanoclays according to the invention it is possible to reduce the amount of conventional fire retardant by 2 to 4% (to reach the same performance level).

The following examples show a comparison between conventional formulations and formulations according to the present invention, wherein:

examples 2 and 3 describe the application of amino-silanes (two different types) obtained by means of the protonization, by an acid, of the amino to quarternary ammonium and thus obtaining an ion exchange silane;
example 6 describes the combination of silane and phosphonium for treatment of nanoclays;
example 8 describes the combination of silane and phosphate for treatment of nanoclays;
example 9 describes the combination of phosphonium and phosphate for treatment of nanoclays;
example 11 describes the combination of phosphate and brominated chemical for treatment of nanoclays;
example 12 describes the treatment by melamine phosphate for nanoclays;

EXAMPLE 1

Aminosilane Modified Montmorillonite Nanoclay

The route of reaction proceeds between hydroxyl groups and oxides of nanoclay and hydrolyzed aminosilane.

100 grams of Na-montmorillonite clay (Cloisite Na, produced by Southern Clay) was dispersed in a methanol/water mixture (300:50).

In a separate container 20.5 g of N-aminoethyl-3-aminopropyl-trimethoxysilane (Dynasilan DAMO, by Degussa) was added to a methanol/water mixture (50:20).

The solution was kept at stirring for 1 hour to develop hydrolysis process, and afterwards incorporated into clay dispersion. The slurry was heated to 50° C. with stirring. Solid was collected by filtration, dried in an oven at 50-70° C., and subsequently grinded to powder. Condensation of absorbed/reacted silane was performed by heating at 110° C. overnight.

Treated material was thoroughly washed out from excess of silane using water/methanol mixture (10:1). The filter cake was dried and milled to fine powder.

The final modified nanoclay had an interlayer distance $d_{001}$ of 16 ANG as measured by X-ray diffraction, and decomposition peak at 352° C. as shown at derivative thermogram of TGA test.

EXAMPLE 2

Nanoclay Modified with Protonized Aminosilane

Modification of nanoclay is realized using aminosilane as coupling agent, wherein the coupling agent was first chemically protonized with equivalent or excessive amount of hydrochloric acid to produce reactive groups able to react with the reactive sites of the layered swellable mineral. In this case, reaction between Na-nanoclay and silane is supposed to proceed as cation exchange process.

100 grams of Cloisite Na were dispersed in the mixture methanol/water (300:50).

In a separate container Dynasilane (DAMO)—24.6 g, was protonized by reaction with 30 g 4N HCl in methanol/water mixture (100:20) at stirring during 1 hour.

Solution of protonized silane was added to the clay slurry, mixed at ambient conditions and heated to 50° C. for 5 h. Solid was collected by filtration, dried in the oven at 50-70° C. and grinded.

In order to complete silane condensation reactions, material was heated overnight at 110° C.

Modified nanoclay was washed thoroughly with methanol/water mixture to remove NaCl and silane excess, dried and milled to fine powder.

Clay had $d_{001}$=17.3 ANG (XRD data) and decomposition peak at 320° C. (derivative TGA curve).

EXAMPLE 3

Nanoclay Modified with Protonized Aminosilane

A procedure similar to that of example 2 was performed to produce organoclay modified with a different type of aminosilane—3-aminopropyltriethoxy silane (dynasilane AMEO, by Degussa or A1100 by GE Specialty Materials). 20.5 g of silane were protonized by reaction with 23.3 g of 4N HCl in methanol/water (100:20) mixture. The solution was added to 100 g Cloisite Na slurry in methanol/water mixture, let to react at heating and dried.

Material, after condensation, washing, final drying and milling showed $d_{001}$=17 ANG and decomposition peak at 290° C.

EXAMPLE 4

Nanoclay Modified with Epoxysilane 7.3 g of 3-glycidyloxypropyl-trimethoxysilane (Dynasilane GLYMO, Degussa) dissolved in methanol/water mixture (100:20) acidified with 8.2 g of 4N HCl, was added to dispersion consisting of 100 g Cloisite Na in methanol/water (300:20). Silane-nanoclay interaction was performed at heating to 70° C. during 6 h, viscous slurry was filtered to separate solid fraction. Dried solid was grinded to powder, heated at 110° C. to accomplish condensation reactions, washed with ethanol/water mixture (5:1), dried and milled to fine powder.

Resulting product demonstrated $d_{001}$=15 ANG and decomposition peak at 313° C.

EXAMPLE 5

Nanoclay Modified with Phosphonium Salt

A solution of ethyl-triphenylphosphonium bromide (ETPP-Br)—43 g, in ethanol/water mixture (100:20) was incorporated into Cloisite Na dispersion—100 g in ethanol/water mixture (300:50), for 6 hours reaction at 70° C.

Solid was removed by filtering, dried at 70-100° C. and milled to fine powder.

Modified nanoclay exhibited $d_{001}$=18.4 ANG and decomposition peaks at 323 and 404° C.

EXAMPLE 6

Modification with Silane/Phosphonium Salt Combination 100 g of Cloisite Na were dispersed in 300 g of methanol and 50 g of water. Solution of 14.2 g ETPP-Br in methanol/water (100:20) was added to nanoclay dispersion. Viscous slurry was heated for 7 hours at 50° C., afterwards a premix containing 10 g silane AMEO dissolved in 100 g methanol plus 20 g water acidified with 6 g of glacial acetic acid was added at stirring and heating to 50° C.

Solid fraction was removed by filtering, washed with water/ethanol mixture (1:1), dried at 70-100° C. and milled to fine powder.

The obtained organoclay showed $d_{001}$=17 ANG and TGA decomposition peak at 410° C.

EXAMPLE 7

Nanoclays Modified with Phosphate Type Fire Retardant

Na-montmorillonite clay modified with phosphate type fire retardant, intended to supply fire retardant properties to polymer based compositions, was prepared at swelling/adsorption process.

Dispersion of 100 g Cloisite Na in 300 g methanol was combined at vigorous mixing with solutions of 43 g resorcinol bis-(diphenyl phosphate)—Reofos RDP or 43 g of bisphenol A bis-(diphenyl phosphate)—Reofos BAPP by Great Lakes Chemical Corp., in 100 g of methanol, left to swell for several hours, dried and milled.

Nanoclay modified with RDP demonstrated TGA decomposition peaks at 263 and 303° C. Nanoclay modified with BAPP fire retardant exhibited TGA decomposition peak at 298° C.

EXAMPLE 8

Modification of Nanoclay with the Silane/Phosphate Type Fire Retardant Combination Ability of silanes to intercalation into interlayer galleries and chemical interaction with nanoclay active sites resulting in the increase of distances between nanoclay platelets was used to combine them with conventional fire retardant chemicals.

A solution of 11 g of aminosilane (DAMO or AMEO) in methanol/water (100:20) acidified with 6 g of glacial acetic acid catalyst was incorporated at stirring into dispersion consisting of 100 g Cloisite Na in 300 g methanol. Viscous slurry was heated for 7 h at 50° C. Afterwards, 20 g of Reofos RDP dissolved in 100 g methanol was added during mixing at 50° C. Solid was separated by filtering, dried at 70-100° C. and milled to fine powder.

Interlayer distance $d_{001}$ was 19.6 ANG; decomposition peaks were observed at 290-340° C.

EXAMPLE 9

Modification of Nanoclay with Phosphonium Salt/Phosphate Type Fire Retardant Combination Ability of phosphonium salts to chemical interaction with montmorillonite particles accompanied with the increase of distance between nanoclay platelets was used to insert conventional flame retardant chemicals in the interlayer galleries of nanoclay and in this way to impart fire retardant properties to polymer based nanocomposites.

100 g of Cloisite Na dispersion in 300 g of organic solvent—methanol or chloroform, was mixed with solution of 5 g ETPP-Br in 100 g of the same solvent. After a cycle of vigorous stirring solution of 20 g of phosphate type fire retardant (Reofos TPP, RDP or BAPP) in 100 g of solvent was added and let to intercalate into nanoclay interlayer galleries.

Material was dried and milled to fine powder.

TGA showed decomposition peaks at 250 and 290° C.

EXAMPLE 10

Modification of Nanoclay Using Brominated Fire Retardant Chemicals

A) Modification in Solution

Cloisite Na was surface modified by swelling of nanoclay particles in solution of tetrabromobisphenol A bis-2,3 dibromopropyl ether (TBBDPE)—FR 720 by DSBG or PE 68 by Great Lakes, in Chlorophorm.

Dispersion of 100 g TBBDPE in 500 g of chloroform was combined at high-shear mixing with solution of 43 g BBDPE in 200 g chloroform. The following stages included evaporation of solvent, drying and milling of powder.

XRD test showed very slight peak indicating high degree of nanoclay exfoliation. Derivative TGA peaks were observed at 295 and 435° C.

B) Modification of Nanoclay in the Melt of TBBDPE

TBBDPE fire retardant was used as a modifying agent in nanoclay intercalation. 75 g of the said fire retardant were brought to melt at 140-160° C.; 25 g of nanoclay Cloisite Na were incorporated by portions into melt at continuous stirring. Reaction/homogenization of the whole mixture continued about 30 min at 140-160° C. Cooled down concentrate was grinded to coarse powder.

No XRD peaks were detected, confirming exfoliation of nanoclay in fire retardant carrier.

At TGA tests, two distinct regions of decomposition were identified. After intensive decomposition in the temperatures interval of 280-320° C., which could be attributed to decomposition of free TBBDPE, a second region was identified where slower weight changes from 60% to about 30% were observed. This may be due to the high stable fraction formed as a result of chemical interactions between the bromine and the nanoclay side OH groups and the Na active sites inside the nanoclay galleries.

Derivative TGA curves showed decomposition peaks at 311 and 526° C.

EXAMPLE 11

Modification of Nanoclay with Phosphonium Salt/Brominated Fire Retardant Combination Dispersion of swollen 100 g Cloisite Na in 500 g chloroform mixed with solution of 20 g ETPP-Br in 100 g chloroform at high-shear mixing, let to react. Afterwards, solution of 23 g TBBDPE in 100 g of chloroform was added at mixing.

After solvent evaporation, material was finally dried and milled to fine powder.

$d_{001}$ interlayer distance detected by XRD method was 18 ANG; TGA decomposition peaks were observed at 260, 423 and 506° C.

EXAMPLE 12

Modification with Melamine Phosphate Fire Retardant/Aminosilane Combination

Silane AMEO—2.7 g solution in 100 g water was added dropwise into preheated to 80° C. thick slurry containing 100 g Cloisite Na and 1500 g water.

Separately 45 g of melamine phosphate (Melapur MP, Ciba) were dissolved in 1000 g of hot water.

Solution was incorporated into nanoclay slurry, off-white precipitate appeared. Mixture was heated to 85° C. at high-shear stirring for 4 h. Precipitate was removed by filtering, washed by water, dried and milled to fine powder.

XRD test indicated increase in $d_{001}$ value from 9 ANG for the neat Cloisite Na to 13 ANG for modified material.

EXAMPLE 13

Modification of Nanoclay with Epoxy Resins

Epoxy resins used for nanoclay modification were derived from bisphenol A and epichlorohydrin, with epoxide equivalent weight of 450-500 (Epon 1001 by Shell or Araldite GT6071 by Huntsman, Ciba).

A solution of 20 g epoxy resin in tetrahydrofuran (THF) was added at mixing to 100 g of Cloisite Na swollen in 350 g of THF accompanied with strong thickening of the slurry. Afterwards, the solvent was evaporated, material finally dried and milled to fine powder.

XRD defined $d_{001}$=13 ANG, derivative TGA decomposition peak was in the range 335-400° C.

EXAMPLE 14

Application of the Modified Nanoclays in Combination with Conventional Fire Retardant Chemicals Examples of application of the modified nanoclays of the previous examples in combinations with conventional fire retardants in formulations based on various polymers are represented in the following tables. Fire performance of nanocompositions is demonstrated in comparison with that of the neat polymers and of compositions where commercial type nanoclay Cloisite 30B was added.

As can be seen in tables 1 and 2, addition of small amount (3.5%) of organoclay with enhanced thermal stability permitted to improve fire retardant properties of PBT and SAN based halogen-free compositions.

TABLE 1

PBT based halogen-free FR nanocompositions

| Material | Ex. of mod NC | Neat PBT | Quat ammonia salt | DAMO silane | DAMO proton | ETPP-Br | Silane + ETPP-Br | Phosphate | Epoxy Resin |
|---|---|---|---|---|---|---|---|---|---|
| PBT 4520 | | 100 | 78.9 | 80.1 | 80.1 | 78 | 79.6 | 76.1 | 85.4 |
| Impact modifiers | | — | 10 | 10 | 10 | 12 | 10 | 12 | 10 |
| FR Reofos TPP | | — | 6 | 6 | 6 | 6 | 6 | 6 | — |

TABLE 1-continued

PBT based halogen-free FR nanocompositions

PBT based FR compositions with modified Nanoclays

| Material | Ex. of mod NC | Neat PBT | Quat ammonia salt | DAMO silane | DAMO proton | ETPP-Br | Silane + ETPP-Br | Phosphate | Epoxy Resin |
|---|---|---|---|---|---|---|---|---|---|
| Cloisite 30B | Commercial | — | 5.1 | — | — | — | — | — | — |
| NC/Amino silane | 1 | — | — | 3.9 | — | — | — | — | — |
| NC/protonized amino silane | 2 | — | — | — | 3.9 | — | — | — | — |
| NC/ETPP-Br | 5 | — | — | — | — | 4 | — | — | — |
| NC/Silane/ETPP-Br | 6 | — | — | — | — | — | 4.4 | — | — |
| NC/Phosphate | 7 | — | — | — | — | — | — | 5.9 | — |
| NC/Epoxy resin | 13 | — | — | — | — | — | — | — | 4.6 |
| % NC content by mineral | | — | 3.5 | 3.5 | 3.5 | 3.5 | 3.5 | 3.5 | 3.5 |

FR properties examined as UL-94 Vertical burning test. Thickness of specimens - 3.2 mm

| | | | | | | | | | |
|---|---|---|---|---|---|---|---|---|---|
| Total flaming time | | V2-NR 180 s | NR 190 s | V2 43 s | V2 27 s | V2 60 s | V2 16 s | V2 83 s | V2 107 s |
| Max flaming time | | 29 s | 33 s | 7 s | 6 s | 18 s | 5 s | 23 s | 21 s |

Nanoclay modified with phosphonium salt/phosphate type fire retardant influenced positively in ABS non-halogen compositions, as shown in table 2, relating to styrenics based halogen-free FR nanocompositions.

TABLE 2

Styrenics based FR compositions with modified nanoclays

| Material | Modified nanoclay example | Neat SAN M-60 | Quaternary ammonia salt | Epoxy Resin | Neat ABS P-2K | ETPP-Br + Phosphate | ETPP-Br + Phosphate |
|---|---|---|---|---|---|---|---|
| SAN M-60, Bayer | | 100 | 95 | 95 | — | 30 | 45.9 |
| ABS P-2K, Bayer | | — | — | — | 100 | 48 | 26.3 |
| FR Reofos TPP | | — | — | — | — | 12 | 16 |
| Cloisite 30B | Commercial | — | 5 | — | — | — | — |
| NC/Epoxy Resin | 13 | — | — | 5 | — | — | — |
| NC/ETPP-Br/Phosphate | 9 | — | — | — | — | 10 | 11.5 |
| NC content, %, by mineral | | — | 3.5 | 4.1 | — | 8 | 10 |

FR properties. Ul-94 Horizontal burning test. Thickness of specimens - 3.2 mm

| Rate of flame spread, | | 13.8 mm/min Burned completely | 27.7 mm/min No drip, smoke | Self-extinguished | 31 mm/min Burned completely | 30.2 mm/min Partly remained | 28 mm/min Partly remained |

FR properties. UL-94 Vertical Burning test. Thickness-3.2 mm

| Total flaming time | | | | | Burned in 1-st ignition in | V2 173 sec 29 sec | V2 112 sec 22 sec |

TABLE 2-continued

| | | Styrenics based FR compositions with modified nanoclays | | | | | |
|---|---|---|---|---|---|---|---|
| Material | Modified nanoclay example | Neat SAN M-60 | Quaternary ammonia salt | Epoxy Resin | Neat ABS P-2K | ETPP-Br + Phosphate | ETPP-Br + Phosphate |
| Max flaming time | | | | | 80 sec | | |

In polypropylene/magnesium hydroxide and nylon/magnesium hydroxide fire retardant compositions low concentrations of modified nanoclays (1-2%), can substitute 5-7% of conventional FR—Table 3 (concerning polypropylene/magnesium hydroxide FR nanocompositions) and Table 4 (concerning Nylon6/magnesium hydroxide FR nanocompositions).

TABLE 3

| | | PP/Magnesium Hydroxide FR compositions with modified Nanoclays | | | | | | |
|---|---|---|---|---|---|---|---|---|
| Material | Modified nanoclay example | | AMEO | ETPP-Br | ETPP-Br | ETPP-Br | Silane + ETPP-Br | ETPP-Br + Phosphate |
| PP Homopolymer | | 38 | 45 | 38 | 42 | 38 | 40 | 38 | 38 |
| Compatibilizer | | — | — | 2 | — | 2 | — | 2 | 2 |
| Magnesium Hydroxide | | 62 | 55 | 55 | 55 | 55 | 52 | 55 | 55 |
| NC/Aminosilane | 3 | — | — | 5 | — | — | — | — | — |
| NC/ETPP-Br | 5 | — | — | — | 3 | 5 | 8 | — | — |
| NC/Silane/ETPP-Br | 6 | — | — | — | — | — | — | 5 | — |
| NC/ETPP-Br/Phosphate | 9 | — | — | — | — | — | — | — | 5 |
| Nanoclay content, %, by mineral | | — | — | 4.2 | 2.1 | 3.5 | 5.6 | 4 | 4 |
| FR Properties. Examined as UL-94 Vertical Burning Test. Thickness - 3.2 mm | | | | | | | | | |
| Total flaming time | | V0 35 sec | V2 144 sec | V1 81 sec | V0-V1 57 sec | V1 62 sec | V1 104 sec | V0-V1 62 sec | V1 95 sec |
| Max flaming time | | 7 sec | 26 sec | 13 sec | 14 sec | 12 sec | 24 sec | 10 sec | 27 sec |

TABLE 4

| | | Nylon 6 based compositions with modified nanoclays | | | | | | | |
|---|---|---|---|---|---|---|---|---|---|
| Material | Modified nanoclay example | Neat Nylon 6 | Nylon 6 - MDH | Comm. | AMEO | AMEO | GLYMO | ETPP-Br | Silane + ETPP-Br |
| Nylon 6 PB-145 | | 100 | 45 | 43 | 46 | 44 | 44 | 43 | 43 |
| Magnesium Hydroxide | | — | 55 | 55 | 53 | 55 | 55 | 55 | 55 |
| Cloisite 30B | | — | — | 2 | — | — | — | — | — |
| NC/Aminosilane | 3 | — | — | — | 1 | 1 | — | — | — |
| NC/Epoxy-Silane | 4 | — | — | — | — | — | 1 | — | — |
| NC/ETPP-Br | 5 | — | — | — | — | — | — | 2 | — |
| NC/Silane/ETPP-Br | 6 | — | — | — | — | — | — | — | 2 |
| FR properties. UL-94 Vertical burning test. Thickness - 3.2 mm | | | | | | | | | |
| Total flaming time | | V2 68 sec | V0 7 sec | — | V0 10 sec | V0 5 sec | V0 14 sec | V0 0 sec | — |
| UL-94 Vertical Burning test. Thickness - 1.6 mm | | | | | | | | | |
| Total flaming time | | V2 38 sec | V2 20 sec | V0-NR 115 sec | V0 38 sec | V0 15 sec | V0 20 sec | V0 18 sec | V0 19 sec |
| Max flaming time | | | | 73 sec | | | 9 sec | 8 sec | 6 sec |

Nanoclay modified to be the carrier for Brominated FR allowed to reduce twice the loading of conventional FR in polypropylene based compositions, as shown in Table 5.

of the nanoclays platelet (this will be made calculating the potential reactive sites and add fire retardant accordingly);

TABLE 5

PP/Brominated FR compositions with modified nanoclays

| Material | Modified nanoclay example | PP neat | PP-FR | PP-FR | ETPP-Br + TBBDPE | TBBDPE solution | TBBDPE solution | TBBDPE melt |
|---|---|---|---|---|---|---|---|---|
| PP Homopolymer | | 100 | 78.4 | 89.2 | 84.4 | 85.2 | 83.7 | 86.2 |
| FR TBBDPE | | — | 16 | 8.1 | 7.2 | 6.4 | 4 | 1.1 |
| Antimony Oxide | | — | 5.3 | 2.7 | 2.7 | 2.7 | 2.3 | 2.7 |
| NC/ETPP-Br/ FR TBBDPE | 11 | — | — | — | 5.7 | — | — | — |
| NC/FR TBBDPE sol | 10-A | — | — | — | | 5.7 | 10 | — |
| NC/FR TBBDPE melt | 10-B | — | — | — | | | | 10 |
| Nanoclay content, %, by mineral | | — | — | — | 4 | 4 | 7 | 2.5 |
| Total TBBDPE content, % | | — | 16 | 8.1 | 8.1 | 8.1 | 7 | 8.6 |

FR properties. UL-94 Vertical Burning test. Thickness 3.2 mm

| Total flaming time, sec | | NR Burned completely | V0 0 Drip | V2 0 Flaming drip | V0 0 Drip | V0 0 Drip | V0 0 Drip | V0 0 Drip |

In polypropylene based intumescent FR compositions improvement in FR properties was achieved at very low (0.5-1%) loadings of modified nanoclay, as shown in table 6.

TABLE 6

PP/Melamine Phosphate FR nanocompositions

| Material | Example of nanoclay modification | | | | AMEO/ Melapur MP | AMEO/ Melapur MP |
|---|---|---|---|---|---|---|
| PP Homopolymer | | 72.4 | 65 | 69 | 70 | 69.5 |
| Melapur MP | | 21.6 | 27.4 | 20.3 | 19.5 | 19.5 |
| Pentaerythritol | | 6 | 7.6 | 5.7 | 7 | 7 |
| Antidrip | | — | — | 5 | 3 | 3 |
| NC/ Melamine Phosphate | 12 | — | — | — | 0.5 | 1 |

FR properties. UL-94 Vertical Burning Test. Thickness - 1.6 mm

| Total flaming time, sec | | V2 23 Flaming drip | V0-V2 23 Flaming drip | V0 13 No drip | V0 11 No drip | V0 16 No drip |

In conclusion, the present invention concerns a novel family of fire retardant modified nanoclays (which can also be employed inside polymers), according to which the nanoclays are modified employing two different binding strategies, which end up with at least two different families of fire retardant species on each and every single nanoclay:

1st binding strategy: fully cover the nanoclays with the fire retardant taking advantage of the OH groups on the edges of the nanoclays and the aluminum oxides and silicon oxides that constitute the upper and lower surface 2nd binding strategy: employ protonised silane for ion exchange of the Na+ ion, thus covering the nanoclays surface with the appropriate amount.

As a consequence of the combination of fire retardant chemicals according to the present invention to treat the nanoclays, a synergy is obtained between at least two differently bounded fire retardant chemicals in the nano range on the same nanoclay. The preferred final product is a composite object, containing two different families and strategies of binding on the same nanoclays. The performances of such an object are higher than the ones in which only a single fire retardant is used. In the case of the combinations it is also possible to obtain a double layer of fire retardant chemicals attached to the nanoclays.

By addition of the nanoclays treated according to the present invention it is possible to reduce the amount of used fire retardant and thus save costs, since fire retardant chemicals are relatively high cost chemicals. In the case of bromine based fire retardant chemicals the amount of BR (and antimony tri-oxide—$Sb_2O_3$—heavy metal) can be reduced and consequently environmental concerns are reduced. On the average, by the addition of 1% of treated nanoclays it is possible to reduce the amount of conventional fire retardant by 2 to 4% (to reach the same performance level).

The FR treated nanoclays can be introduced into molten polymers by blending and mixing compounders, thus obtaining a wide range of products with improved fire retardant features.

For illustrative non limitative purposes, such products can comprise: semi-processed object such as fabrics, foams, panels and sheets, beams, foils and coatings; industrial workwear and protective clothing; final products for various sectors of application.

For illustrative non limitative purposes, such sectors of application can comprise:

automotive, rail, shipyard, aerospace, buildings and infrastructure, industrial, oil and gas, defense, homecare, house appliances, child-care, cleantech (renewable energies, recycling, etc.).

For illustrative non limitative purposes, such sectors of application can comprise possible methodologies of polymer manufacturing, injection moulding, extrusion, lamination, thermoforming, compression moulding, blow moulding, pultrusion.

The description above shows that all the purposes of the present invention were achieved and in particular:

1) the thermal stability of the organically modified nanoclays was enhanced by intercalating the nanoclays with chemicals having enhanced thermal stability, such as for example silanes, epoxy resin, phosphonium salt, melamine-phosphates;

2) the concentration of flammable constituents introduced by the organic modifiers and the products of polymers decomposition was reduced by using organic modifiers at lower loadings;

3) the ability of nanoclay to interact with organic additives in the process of intercalation (swelling) and thus to use it to serve as a carrier of conventional fire retardant, such as for example phosphates, melamine-phosphates, silanes, brominated compounds, was exploited, the fire resistant treated nanoclays distributing the fire resistant features in the matrix of polymer at nanoscale level;

4) the combination of chemical modification of nanoclay (using thermally stable materials like epoxy resin, phosphonium salts, silanes) with swelling of this layered silicate in the conventional fire retardants was also achieved.

The present invention was described for illustrative, non limitative purposes, according to some preferred embodiments thereof, but it has to be understood that any variation and/or modification can be made by the skilled in the art without for this reason escaping the scope of protection defined by the enclosed claims.

The invention claimed is:

1. A fire retardant material comprising nanoclays intercalated with protonised silane, and with at least one additional fire retardant compound selected from the group consisting of phosphates, brominated chemicals, amino-phosphates, and melamine-phosphates, and wherein said fire retardant material has an interlayer distance d001 of about 16-17.3 ANG as measured by X-ray diffraction.

2. The fire retardant material according to claim 1, wherein said interlayer distance d001 is 17-17.3 ANG.

3. The fire retardant material according to claim 1, wherein said fire retardant material includes polymers, plastics or elastomeric based materials.

4. The fire retardant material according to claim 1, wherein the nanoclays have at least one surface and at least one edge plane and the at least one additional fire retardant compound is bound to OH groups on the edge plane, or on Al/Si oxide on the nanoclay surface, or both.

5. Fire retardant material according to claim 1, wherein the fire retardant material comprises polypropylene (PP), acrylonitrile-butadiene-styrene (ABS), polybutylene terephthalate (PBT), polystyrene (PS), polyamides (PA) or a mixture thereof.

6. A method of making a fire retardant material having nanoclays intercalated with protonized silane, and with at least one additional fire retardant compound selected from the group consisting of phosphates, brominated chemicals, amino-phosphates, and melamine-phosphates, and wherein said fire retardant material has an interlayer distance d001 of about 16-17.3 ANG as measured by X-ray diffraction comprising:

reacting silane with an acid solution to obtain protonising silane;

adding the protonised silane to a dispersion of nanoclays in a solvent; adding one or more fire retardant compound selected from the group consisting of phosphates, brominated chemicals, amino-phosphates, and melamine-phosphates, wherein the fire retardant compounds have high thermal stability and flame retardation properties to the dispersion;

heating the solvent to a temperature up to about 70° C. to obtain a viscous slurry;

filtering the slurry to separate a solid fraction;

drying the solid fraction; and milling the dried solid fraction into a powder.

7. The method of making a fire retardant material according to claim 6, wherein said solvent is methanol or a mixture of methanol and water.

8. The method of making a fire retardant material according to claim 6, further comprising after the drying step:

grinding the solid fraction into powder;

heating the powder up to about 110° C.;

washing the heated powder with an ethanol/water mixture; and drying the washed powder.

9. The method of making the fire retardant material according to claim 6, further comprising:

adding the powder to a melt of polymers, plastics and elastomeric based materials; and adding compounders to the mixture.

10. The method of claim 6, wherein the heating step lasts 5-7 hours.

* * * * *